United States Patent
Hodatsu

(10) Patent No.: US 9,884,607 B2
(45) Date of Patent: Feb. 6, 2018

(54) SEAT BELT RETRACTOR AND SEAT BELT DEVICE

(71) Applicant: TAKATA CORPORATION, Tokyo (JP)

(72) Inventor: Yuichiro Hodatsu, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 15 days.

(21) Appl. No.: 15/165,527

(22) Filed: May 26, 2016

(65) Prior Publication Data

US 2016/0347275 A1 Dec. 1, 2016

(30) Foreign Application Priority Data

May 28, 2015 (JP) ................................. 2015-108259

(51) Int. Cl.
*B60R 22/34* (2006.01)
*B60R 22/38* (2006.01)
*B60R 22/405* (2006.01)

(52) U.S. Cl.
CPC .............. *B60R 22/34* (2013.01); *B60R 22/38* (2013.01); *B60R 22/405* (2013.01)

(58) Field of Classification Search
CPC ........ B60R 22/34; B60R 22/405; B60R 22/38
See application file for complete search history.

(56) References Cited

U.S. PATENT DOCUMENTS

| | | | |
|---|---|---|---|
| 4,300,733 A | 11/1981 | Morinaga | |
| 6,305,633 B1 | 10/2001 | Asagiri et al. | |
| 2008/0029633 A1* | 2/2008 | Hiramatsu | B60R 22/3413 242/379.1 |
| 2011/0290929 A1 | 12/2011 | Tatsuma et al. | |
| 2011/0290930 A1* | 12/2011 | Tatsuma | B60R 22/38 242/383.2 |
| 2012/0175451 A1* | 7/2012 | Yanagawa | B60R 22/38 242/379.1 |
| 2013/0140869 A1* | 6/2013 | Uchibori | B60R 22/38 297/476 |
| 2014/0203620 A1* | 7/2014 | Hiramatsu | B60R 22/4676 297/475 |
| 2015/0360642 A1* | 12/2015 | Lee | B60R 22/405 242/383.2 |

(Continued)

FOREIGN PATENT DOCUMENTS

JP 2014-080121 A 5/2014

*Primary Examiner* — Darlene P Condra

(74) *Attorney, Agent, or Firm* — Foley & Lardner LLP

(57) ABSTRACT

To provide a seatbelt retractor and a seatbelt device that can suppress the occurrence of abnormal noise. A seatbelt retractor 1 includes a spool 2 that retracts webbing configured to restrain an occupant, a base frame 3 that houses the spool 2 rotatably, and a lock mechanism 4 that restricts rotation of the spool 2. The lock mechanism 4 includes a locking base 41, a pawl 42, a pawl spring 43, and a lock gear 44. The pawl 42 includes a first restraint portion 42a that restrains movement of the pawl 42 in one rotating direction of the spool 2 while being located inside an outer periphery of the locking base 41, and a second restraint portion 42b that restrains the movement of the pawl 42 in an opposite rotating direction of the spool 2 while the movement is retrained by the first restraint portion 42a.

8 Claims, 5 Drawing Sheets

(56) References Cited

U.S. PATENT DOCUMENTS

2016/0046260 A1\* 2/2016 Nakamura .......... B60R 22/3413
242/379.1
2016/0347274 A1\* 12/2016 Fukuta .................... B60R 22/34
2017/0129450 A1\* 5/2017 Suga ....................... B60R 22/34

\* cited by examiner

SEAT BELT RETRACTOR AND SEAT BELT DEVICE

FIELD OF THE INVENTION

The present invention relates to a seatbelt retractor and a seatbelt device, and more particularly, to a seatbelt retractor having a lock mechanism engageable with a base plate and a seatbelt device including the seatbelt retractor.

BACKGROUND OF THE INVENTION

Vehicles, such as automobiles, are generally provided with a seatbelt device that restrains an occupant on a seat including a seat section on which the occupant sits and a backrest section located on the back of the occupant. Such a seatbelt device includes webbing that restrains the occupant, a seatbelt retractor that retracts the webbing, a guide anchor provided on a vehicle body to guide the webbing, a belt anchor that fixes the webbing to the vehicle body, a buckle disposed on a side surface of the seat, and a tongue disposed on the webbing. The occupant is restrained in the seat by the webbing by fitting the tongue in the buckle.

Such a seatbelt retractor often includes a spool that retracts the webbing, a base frame that houses the spool rotatably, a spring unit that applies retracting force to the spool, a vehicle sensor that detects rapid deceleration of the vehicle, a lock mechanism actuated by the vehicle sensor to engage the spool with the base frame, and a pretensioner that removes the slack of the webbing in an emergency such as a vehicle collision (see, for example, Japanese Unexamined Patent Application Publication No. 2014-80121 and Japanese Unexamined Patent Application Publication No. 2000-289571).

SUMMARY OF THE INVENTION

For example, as described in Japanese Unexamined Patent Application Publication No. 2000-289571, the above-described lock mechanism often includes a base lock (also referred to as a locking base) connected to an end portion of the spool, a lock plate (also referred to as a pawl) disposed movably outward in the radial direction relative to the base lock, and ratchet teeth (also referred to as engaging teeth) provided on an inner rim of an aperture provided in the base frame.

As described in Japanese Unexamined Patent Application Publication No. 2000-289571, the above-described lock plate (pawl) is disposed in a recess (receiving portion) provided in the lock base (locking base), and is retreated at a position such as not to engage with the ratchet teeth (engaging teeth) of the base frame in a normal state (an unlocked state). Since the lock plate (pawl) is structured to move outward in the radial direction relative to the base lock and to engage with the ratchet teeth (engaging teeth) of the base frame in an emergency such as a vehicle collision, it is loosely fitted in the receiving portion. Therefore, for example, when vibrations occur in the seatbelt retractor, the lock plate (pawl) hits a wall surface of the receiving portion, and this causes abnormal noise.

The present invention has been made in view of such a problem, and an object of the present invention is to provide a seatbelt retractor and a seatbelt device that can suppress the occurrence of abnormal noise.

The present invention provides a seatbelt retractor including a spool that retracts webbing configured to restrain an occupant, a base frame that houses the spool rotatably, and a lock mechanism that restricts rotation of the spool. The lock mechanism includes a locking base disposed in an end portion of the spool, a pawl disposed to protrude outward from an outer periphery of the locking base, a pawl spring that biases the pawl inward relative to the locking base, and a lock gear coaxially disposed to rotate relative to the locking base. The pawl includes a first restraint portion that restrains movement of the pawl in one rotating direction of the spool while being located inside the outer periphery of the locking base, and a second restraint portion that restrains the movement of the pawl in an opposite rotating direction of the spool while the movement of the pawl is retrained by the first restraint portion.

The present invention also provides a seatbelt device including webbing that restrains an occupant, a seatbelt retractor that retracts the webbing, a guide anchor provided on a vehicle body to guide the webbing, a belt anchor that fixes the webbing to the vehicle body, a buckle disposed on a side surface of a seat on which the occupant sits, and a tongue disposed on the webbing. The seatbelt retractor includes a spool that retracts the webbing, a base frame that houses the spool rotatably, and a lock mechanism that restricts rotation of the spool. The lock mechanism includes a locking base disposed in an end portion of the spool, a pawl disposed to protrude outward from an outer periphery of the locking base, a pawl spring that biases the pawl inward relative to the locking base, and a lock gear disposed coaxially with the locking base to rotate relative to the locking base. The pawl includes a first restraint portion that restrains movement of the pawl in one rotating direction of the spool while being located inside the outer periphery of the locking base, and a second restraint portion that restrains the movement of the pawl in an opposite rotating direction of the spool while the movement is retrained by the first restraint portion.

In the seatbelt retractor and the seatbelt device of the present invention described above, the pawl may be received in a recess provided in the spool or the locking base.

The first restraint portion may be a portion in contact with a component having the recess, and the second restraint portion may be a portion in contact with the component having the recess or the lock gear.

The first restraint portion may be a portion in contact with a component having the recess, the second restraint portion may be a portion in contact with the lock gear, and the first restraint portion and the second restraint portion may form a wedge shape with respect to the component having the recess and the lock gear. The lock gear may include an engaging portion engageable with the component having the recess in a state in which the movement of the pawl is restrained by the first restraint portion.

The first restraint portion and the second restraint portion may be portions in contact with the component having the recess, and the first restraint portion and the second restraint portion may form a wedge shape with respect to the component having the recess.

According to the seatbelt retractor and the seatbelt device of the present invention described above, when the pawl that constitutes the lock mechanism is received (in a non-operation state), the movement of the pawl can be restrained in both rotating directions of the spool by the first restraint portion and the second restraint portion, the movement relative to the locking base can be suppressed, and the occurrence of abnormal noise can be suppressed.

BRIEF DESCRIPTION OF THE DRAWINGS

FIG. 2A is a perspective view from the front side, and FIG. 2B is a perspective view from the back side.

FIG. 3A illustrates a normal state, and FIG. 3B illustrates a lock mechanism operating state.

FIG. 4A illustrates a normal state, and FIG. 4B illustrates a lock mechanism operating state.

DETAILED DESCRIPTION OF THE PREFERRED EMBODIMENTS

Figure 1:
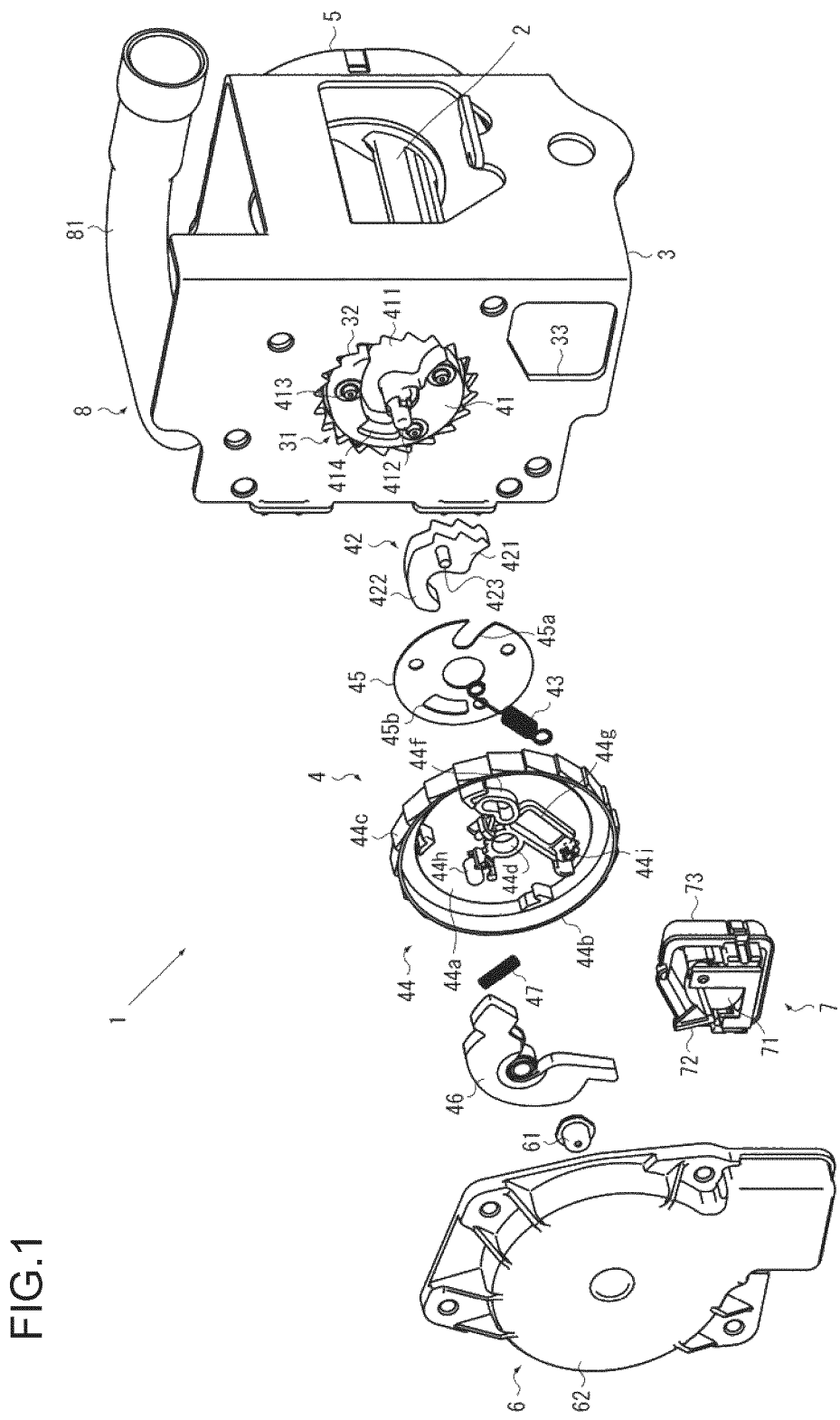
FIG. 1 is a component developed view of a seatbelt retractor according to an embodiment of the present invention.
Figure 2A:
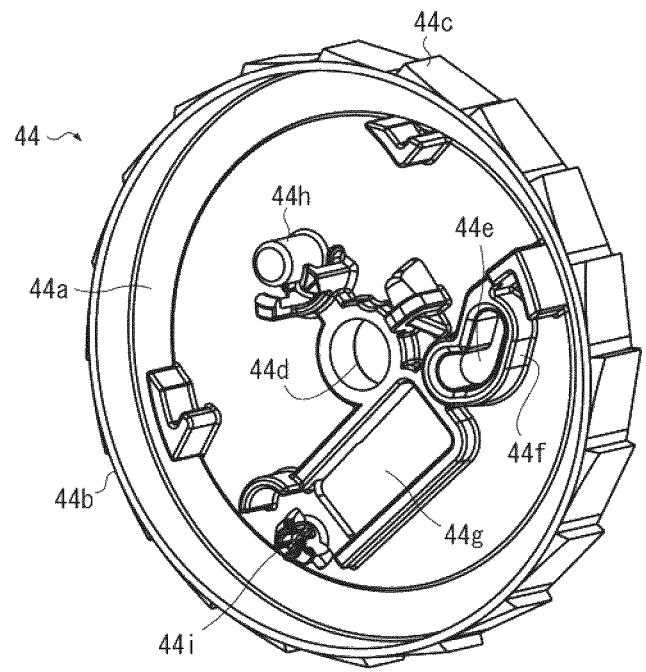
FIGS. 2A and 2B are explanatory views of a lock gear illustrated in FIG. 1.
Figure 2B:
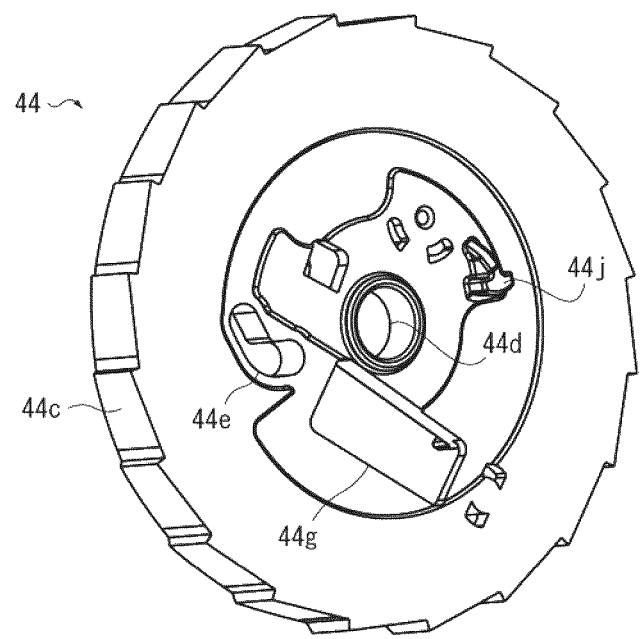
Figure 3A:
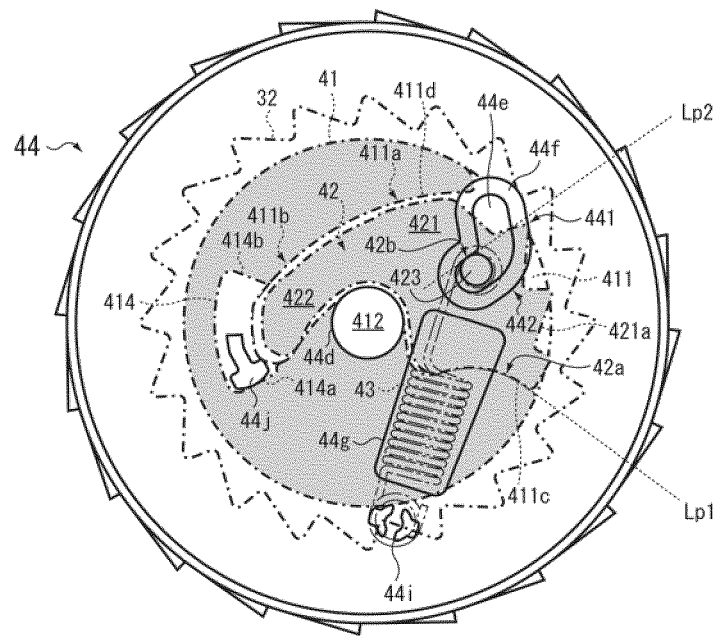
FIGS. 3A and 3B are explanatory views illustrating the operation of the seatbelt retractor illustrated in FIG. 1.
Figure 3B:
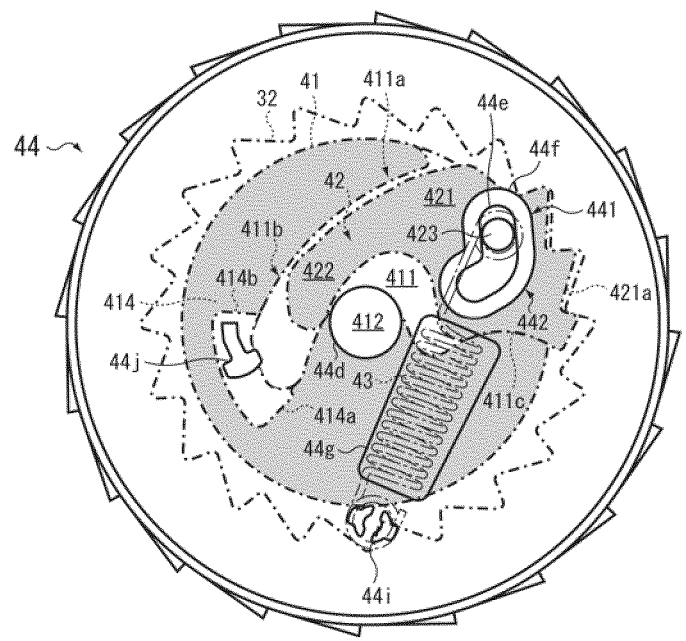

An embodiment of the present invention will be described below with reference to FIGS. 1 to 5. Here, FIG. 1 is a component developed view of a seatbelt retractor according to an embodiment of the present invention. FIGS. 2A and 2B are explanatory views of a lock gear illustrated in FIG. 1, FIG. 2A is a perspective view from the front side, and FIG. 2B is a perspective view from the back side. FIGS. 3A and 3B are explanatory views illustrating the operation of the seatbelt retractor illustrated in FIG. 1, FIG. 3A illustrates a normal state, and FIG. 3B illustrates a lock mechanism operating state. In FIG. 1, illustration of webbing is omitted for convenience of explanation.

As illustrated in FIG. 1, a seatbelt retractor 1 according to the embodiment of the present invention includes a spool 2 that retracts webbing for restraining the occupant, a base frame 3 that houses the spool 2 rotatably, and a lock mechanism 4 that restricts the rotation of the spool 2. The lock mechanism 4 includes a locking base 41 disposed in an end portion of the spool 2, a pawl 42 disposed on the locking base 41 and disposed to protrude outward from an outer periphery of the locking base 41, a pawl spring 43 that biases the pawl 42 inward relative to the locking base 41, and a lock gear 44 disposed coaxially with the locking base 41 to rotate relative to the locking base 41. The pawl 42 includes a first restraint portion 42a that restrains the movement of the pawl 42 in one rotating direction of the spool 2 while being located on an inner side of the outer periphery of the locking base 41, and a second restraint portion 42b that restrains the movement of the pawl 42 in an opposite rotating direction of the spool 2 while the movement is restrained by the first restraint portion 42a.

The spool 2 is a winding drum for retracting the webbing. For example, the spool 2 is rotatably supported at one end by a spring unit 5, and is connected at the other end to the locking base 41. The locking base 41 is rotatably supported by a retainer cover 6 with a cap 61 being disposed therebetween. The spring unit 5 is a component that biases the spool 2 in a retracting direction, and contains a spiral spring. The retainer cover 6 is a component that receives the lock mechanism 4 and a vehicle sensor 7. The spring unit 5 and the retainer cover 6 are directly or indirectly fixed to the base frame 3.

The seatbelt retractor 1 may further include a pretensioner 8 that removes the slack of the webbing in an emergency such as a vehicle collision. In the embodiment, the pretensioner 8 is disposed inside the base frame 3 adjacent to the locking base 41, and only a pipe 81 that discharges a mass body for rotating the spool 2 is illustrated in FIG. 1. The arrangement of the pretensioner 8 is not limited to the illustrated one. The pretensioner 8 may be disposed outside the base frame 3 adjacent to the locking base 41 or may be disposed inside the spring unit 5.

For example, the base frame 3 is a frame structure having a substantially angular U-shaped cross section. A pair of wall members that form side surfaces are provided at opposite ends of a wall member that forms a rear surface. The pair of wall members that form the side surfaces have apertures 31 through which end portions of the spool 2 (including the locking base 41) are passed. A tie plate that forms a front surface may be connected to distal ends of the pair of wall members that form the side surfaces. As illustrated in FIG. 1, engaging teeth 32 are provided on inner rims of the apertures 31.

The side surface of the base frame 3 may have an aperture 33 that retains the vehicle sensor 7. For example, the vehicle sensor 7 includes a spherical mass body 71, a sensor lever 72 to be swung by movement of the mass body 71, and a sensor cover 73 that receives and retains the mass body 71 and the sensor lever 72 in the aperture 33. According to this vehicle sensor 7, when a deceleration or a tilt more than or equal to a predetermined value occurs in the vehicle body, the mass body 71 disturbs its balance and pushes the sensor lever 72 upward, and a distal end of the sensor lever 72 engages with the lock gear 44, so that the rotation of the lock gear 44 is restricted.

For example, the lock mechanism 4 includes the locking base 41, the pawl 42, the pawl spring 43, the lock gear 44, a protect cover 45 that restricts movement of the pawl 42 in the axial direction of the spool 2, a flywheel 46 swingably disposed on the lock gear 44, and a hook spring 47 that biases a distal end of the flywheel 46 inward in the radial direction.

As illustrated in FIG. 1, the locking base 41 is inserted in the aperture 31 of the base frame 3 and is disposed so that an outer peripheral portion thereof is opposed to the engaging teeth 32. The locking base 41 has enough thickness to form a receiving portion for the pawl 42, and has, in a front surface, a recess 411 for receiving the pawl 42. The locking base 41 includes a shaft portion 412 that forms a rotation shaft of the spool 2, and a plurality of projections 413 that fixes the protect cover 45.

For example, as illustrated in FIG. 3A, the recess 411 includes a wide portion 411a provided along the outer periphery of the locking base 41 to extend wide to a portion near the shaft portion 412, and a guide portion 411b extending from the wide portion 411a toward the opposite outer periphery around the shaft portion 412. The wide portion 411a includes a first wall surface portion 411c provided on a side far from the guide portion 411b and a second wall surface portion 411d provided on a side close to the guide portion 411b.

In FIGS. 3A and 3B, for convenience of explanation, components of the lock gear 44 are shown by solid lines, and the engaging teeth 32 of the base frame 3, the locking base 41, the pawl 42, and the pawl spring 43 are shown by one-dot chain lines. Surfaces of the locking base 41 and the pawl 42 are painted in gray.

The first wall surface portion 411c is provided opposed to one rotating direction of the spool 2 (clockwise direction in the figures). The second wall surface portion 411d is provided opposed to an opposite rotating direction of the spool 2 (counterclockwise direction in the figures). The distance between the first wall surface portion 411c and the second wall surface portion 411d may decrease from the outer periphery of the locking base 41 toward the center.

For example, the first wall surface portion 411c may be shaped to be convex in the opposite rotating direction of the spool 2 (counterclockwise direction in the figures). For example, the second wall surface portion 411d may be shaped to be concave in the opposite rotating direction of the spool 2 (counterclockwise direction in the figures). The second wall surface portion 411d may be provided to continue from a wall surface portion for forming the guide portion 411b with almost the same curvature.

For example, as illustrated in FIG. 3A, the pawl 42 includes a head portion 421 received in the wide portion 411a that constitutes the recess 411 of the locking base 41 and a tail portion 422 received in the guide portion 411b that constitutes the recess 411 of the locking base 41. As illustrated, the pawl 42 has substantially the same outer shape as that of the recess 411, and is loosely fitted in the recess 411. On the outer periphery of the head portion 421, teeth portion 421a are provided along the outer periphery of the locking base 41.

The head portion 421 has a first restraint portion 42a provided along the first wall surface portion 411c of the wide portion 411a to be in contact therewith. As illustrated, the first restraint portion 42a has a concave shape corresponding to the convex shape of the first wall surface portion 411c. This shape allows the first restraint portion 42a to be movable toward the outer side of the outer periphery of the locking base 41 while being in contact with the first wall surface portion 411c.

The tail portion 422 is disposed in the guide portion 411b to have the function of stabilizing the posture of the pawl 42 when the head portion 421 moves to the outer side or the inner side of the outer periphery of the locking base 41.

As illustrated in FIGS. 1 and 3A, the pawl 42 has a pawl pin 423 that is passed through an aperture (cam hole 44e) provided in the lock gear 44 and moves the pawl 42 when relative rotation occurs between the locking base 41 and the lock gear 44.

The pawl 42 may be configured movable toward the outer side of the outer periphery of the locking base 41 by sliding, or may be configured movable toward the outer side of the outer periphery by turning. The shape of the recess 411 of the locking base 41 for receiving the pawl 42 is not limited to the illustrated shape, and can be appropriately changed according to the shape and structure of the pawl 42.

While the locking base 41 is connected to the end portion of the spool 2 and the surface of the end portion has the recess 411 for receiving the pawl 42 in the embodiment, as described above, the present invention is not limited to such an embodiment. For example, when an annular locking base 41 is connected the outer periphery of the end portion of the spool 2 or when the spool 2 and the locking base 41 are integrally formed, the surface of the end portion of the spool 2 may have the recess 411 for receiving the pawl 42. Therefore, in the embodiment "component having the recess 411" refers to the locking base 41 or the spool 2.

For example, as illustrated in FIGS. 1, 2A, and 2B, the lock gear 44 includes a disc portion 44a disposed opposed to the locking base 41 and an outer peripheral wall 44b standing outward along an outer rim of the disc portion 44a. On an outer surface of the outer peripheral wall 44b, engaging teeth 44c are provided to be engageable with the sensor lever 72 of the vehicle sensor 7.

As illustrated in FIG. 2A, the disc portion 44a has, for example, an insertion hole 44d through which the shaft portion 412 of the locking base 41 is passed, a substantially V-shaped cam hole 44e through which the pawl pin 423 is passed, a guide wall 44f standing outward along an outer periphery of the cam hole 44e to guide the pawl pin 423, an aperture 44g that avoids interference with the pawl spring 43, a support pin 44h that supports the flywheel 46 swingably, and a hook pin 44i that supports one end of the pawl spring 43.

The cam hole 44e and the guide wall 44f constitute a cam mechanism that guides movement of the pawl 42, and have the function of guiding the pawl 42 to push the pawl 42 to the outer side of the outer periphery of the locking base 41. Further, to change the moving track of the pawl 42, the cam hole 44e and the guide wall 44f have, for example, a first guide portion 441 provided in the substantially circumferential direction and a second guide portion 442 provided in the substantially radial direction. For example, the first guide portion 441 and the second guide portion 442 form a substantially V-shape to be convex toward the outer periphery. The shape of the guide portion for guiding the pawl 42 is not limited to the substantially V-shape, and may be, for example, a substantially U-shape, a substantially J-shape, or a substantially C-shape.

As illustrated in FIG. 3A, the pawl spring 43 is retained at one end by the hook pin 44i, is retained at the other end by the pawl pin 423, and is disposed so that a coil part thereof can expand and contract within the aperture 44g. In a normal state (a non-operation state of the lock mechanism 4), the pawl 42 is biased by the pawl spring 43 so that the first restraint portion 42a is pressed against the first wall surface portion 411c, as illustrated.

As illustrated in FIG. 2B, a projection-like engaging portion 44j is provided on a back surface of the disc portion 44a to be engageable with the locking base 41. As illustrated in FIGS. 1 and 3A, the front surface of the locking base 41 has a slot 414 in which the engaging portion 44j can be inserted. The slat 414 is provided along the rotating direction of the locking base 41, has a first end surface 414a in the counterclockwise direction in the figures, and has a second end surface 414b in the clockwise direction in the figures.

As illustrated in FIG. 3A, the engaging portion 44j and the first end surface 414a are provided to touch with each other before the pawl pin 423 touches a surface of the second guide portion 442 close to the first wall surface portion 411c in a state in which the first restraint portion 42a of the pawl 42 is pressed against the first wall surface portion 411c. That is, when the pawl 42 is pulled inward by the pawl spring 43, the first restraint portion 42a of the pawl 42 touches the first wall surface portion 411c of the locking base 41, and the pawl 42 and the locking base 41 move in the clockwise direction in the figures. After that, the engaging portion 44j and the first end surface 414a touch with each other, and this restricts relative rotation between the locking base 41 and the lock gear 44. Therefore, the lock gear 44 has the engaging portion 44j that can engage with the locking base 41 in a state in which the movement of the pawl 42 is restrained by the first restraint portion 42a.

When the pawl 42 is further pulled inward by the pawl spring 43, the pawl pin 423 moves in contact with the surface of the second guide portion 442 far from the first wall surface portion 411c. This portion of the pawl pin 423 in contact with the second guide portion 442 forms the second restraint portion 42b of the pawl 42.

Here, an extension of the portion where the first restraint portion 42a of the pawl 42 is in contact with the first wall surface portion 411c of the locking base 41 is taken as Lp1, and an extension of the portion where the second restraint portion 42b of the pawl 42 is in contact with the second guide portion 442 of the lock gear 44 is taken as Lp2. As illustrated in FIG. 3A, the extension Lp1 and the extension Lp2 are provided to intersect near the shaft portion 412 of the locking base 41. That is, the first restraint portion 42a is a portion in contact with the locking base 41, and the second restraint portion 42b is a portion in contact with the lock gear 44. The first restraint portion 42a and the second restraint portion 42b form a wedge shape with respect to the locking base 41 and the lock gear 44.

By thus forming the first restraint portion 42a and the second restraint portion 42b that form the wedge shape in the pawl 42, when the pawl 42 is received (non-operation state of the lock mechanism 4), it can be clamped from both sides by the locking base 41 and the lock gear 44, and this can restrict the movement of the pawl 42 in both rotating directions of the spool 2 and can suppress the movement of the pawl 42 relative to the locking base 41. Therefore, even when vibrations occur in the seatbelt retractor 1, the movement of the pawl 42 can be restricted, and the occurrence of abnormal noise can be suppressed.

Besides apertures through which the shaft portion 412 and the projections 413 of the locking base 41 are passed, the protect cover 45 has a cutout 45a through Which the pawl pin 423 of the pawl 42 is passed and an aperture 45b through which the engaging portion 44j of the lock gear 44 is passed.

The retainer cover 6 has a substantially cylindrical projecting portion 62 that covers the outer periphery of the outer peripheral wall 44b of the lock gear 44. Inside the projecting portion 62, an inner peripheral wall (not illustrated) is provided on the inner side of the outer peripheral wall 44b of the lock gear 44. Therefore, when the lock mechanism 4 is assembled, the outer peripheral wall 44b of the lock gear 44 is inserted between the inner peripheral wall and the projecting portion 62, and the flywheel 46 is disposed on the inner side of the inner peripheral wall. An inner surface of the inner peripheral wall is provided with a claw (not illustrated) to be engageable with the distal end of the flywheel 46.

According to the lock mechanism 4 having the above-described structure, in the normal state (when the withdraw acceleration of the webbing is less than or equal to a predetermined threshold value), the locking base 41 and the lock gear 44 rotate together along with the rotation of the spool 2. Therefore, since the spool 2 (locking base 41) and the lock gear 44 do not rotate relative to each other in the normal state, the pawl 42 is kept in the state retreated at the position such as not to interfere with the engaging teeth 32 of the base frame 3, as illustrated in FIG. 3A. At this time, since the movement of the pawl 42 is restrained by the locking base 41 and the lock gear 44, abnormal noise is not caused.

When the withdraw acceleration of the webbing is higher than the regular withdraw acceleration, that is, when the withdraw acceleration of the webbing exceeds the predetermined threshold value, the flywheel 46 swings and engages with the claw of the retainer cover 6 (not illustrated), and this restricts the rotation of the lock gear 44. When the vehicle sensor 7 is actuated, the distal end of the sensor lever 72 engages with the engaging teeth 44c provided on the outer surface of the outer peripheral wall 44b of the lock gear 44, and this also restricts the rotation of the lock gear 44.

When the rotation of the lock gear 44 is thus restricted, relative rotation occurs between the spool 2 (locking base 41) and the lock gear 44. Along with the relative rotation, the pawl 42 slides along the recess 411, and the teeth portion 421a of the pawl 42 approaches and engages with the engaging teeth 32 provided on the inner rim of the aperture 31 of the base frame 3, as illustrated in FIG. 3B. As a result, the rotation of the locking base 41 (spool 2) is restricted, and withdraw of the webbing is restricted.

In the operating state of the lock mechanism 4 illustrated in FIG. 3B, the engaging portion 44j of the lock gear 44 moves along the slot 414 provided in the locking base 41. Therefore, the length of the slot 414 (distance in the rotating direction from the first end surface 414a to the second end surface 414b) is designed to be more than the amount of relative rotation caused between the locking base 41 and the lock gear 44 until the pawl 42 engages with the base frame 3.

While the projection-like engaging portion 44j is provided on the back surface of the lock gear 44 and the slot 414 is provided in the front surface of the locking base 41 in the above-described embodiment, a projection may be provided on the front surface of the locking base 41 and a slot-like engaging portion may be provided in the back surface of the lock gear 44.

Figure 4A:
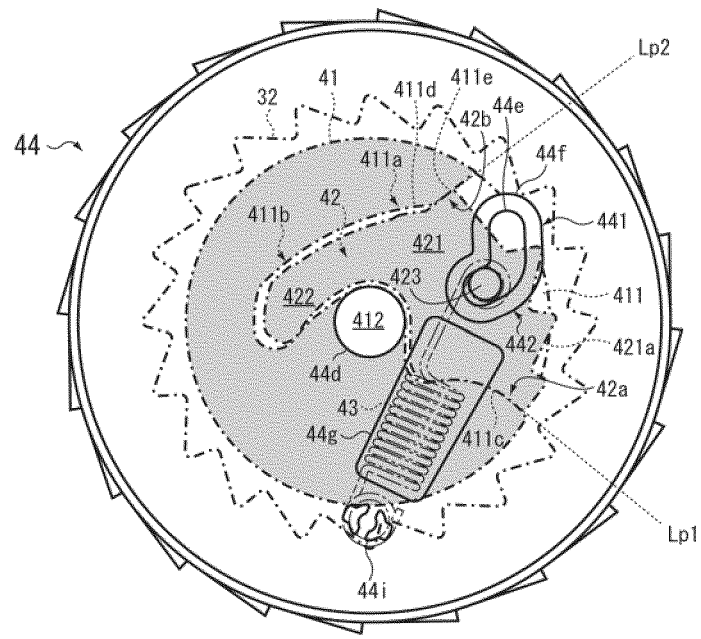
FIGS. 4A and 4B are explanatory views of a modification of a seatbelt retractor.
Figure 4B:
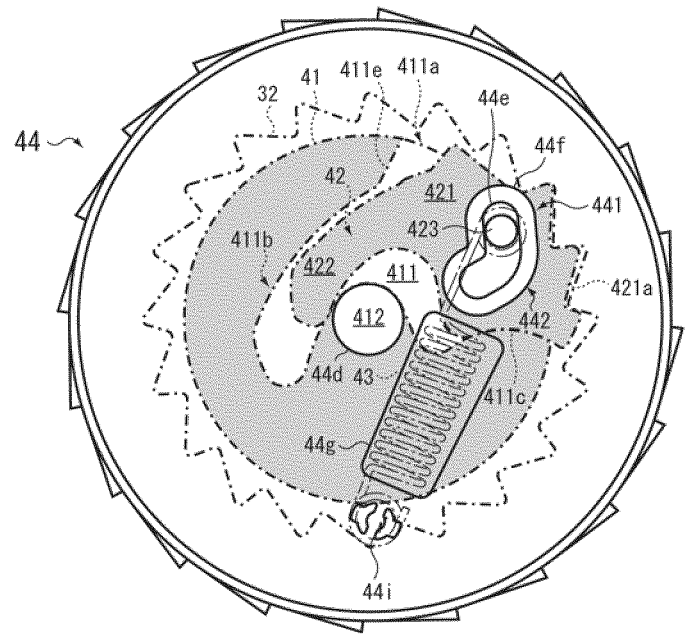

Next, a modification of the above-described seatbelt retractor 1 will be described with reference to FIGS. 4A and 4B. Here, FIGS. 4A and 4B are explanatory views of the modification of the seatbelt retractor, FIG. 4A illustrates a normal state, and FIG. 4B illustrates a lock mechanism operating state. The same components as those of the above-described embodiment are denoted by the same reference numerals, and redundant descriptions thereof are omitted.

In FIGS. 4A and 4B, for convenience of explanation, components of a lock gear 44 are shown by solid lines, engaging teeth 32 of a base frame 3, a locking base 41, a pawl 42, and a pawl spring 43 are shown by one-dot chain lines, and surfaces of the locking base 41 and the pawl 42 are filled in gray.

In the modification illustrated in FIGS. 4A and 4B, the position of a second restraint portion 42b is changed. Specifically, in this modification, an inclined surface 411e inclined toward a shaft portion 412 is provided in a distal end portion of a second wall surface portion 411d that forms a recess 411 of the locking base 41, and a projecting portion (second restraint portion 42b) to be in contact with the inclined surface 411e is provided in a head portion 421 of the pawl 42. As illustrated, the second restraint portion 42b is provided on a side opposite from a first restraint portion 42a, for example, near the boundary between the head portion 421 and a tail portion 422.

In the modification, when the pawl 42 is pulled inward by the pawl spring 43, the first restraint portion 42a of the pawl 42 touches a first wall surface portion 411c of the locking base 41. After that, the pawl pin 423 touches a guide wall 44f, and the lock gear 44 is thereby positioned. When the pawl 42 is further pulled inward by the pawl spring 43, the second restraint portion 42b touches the inclined surface 411e, and the pawl 42 is thereby positioned.

Here, an extension of a portion of the first restraint portion 42a of the pawl 42 that touches the first wall surface portion 411c of the locking base 41 is taken as Lp1, and an extension of a portion of the second restraint portion 42b of the pawl 42 that touches the inclined surface 411e of the locking base 41 is taken as Lp2. As illustrated in FIG. 4A, the extension Lp1 and the extension Lp2 are provided to intersect near the shaft portion 412 of the locking base 41. That is, the first restraint portion 42a and the second restraint portion 42b are portions in contact with the locking base 41, and the first restraint portion 42a and the second restraint portion 42b form a wedge shape with respect to the locking base 41.

According to this modification, in the received state of the pawl 42 (non-operation state of the lock mechanism 4), the pawl 42 can be clamped from both sides by the first wall surface portion 411c and the inclined surface 411e of the locking base 41, the movement of the pawl 42 in both of the rotating directions of the spool 2 can be restrained by the first restraint portion 42a and the second restraint portion 42b, and the movement of the pawl 42 relative to the locking base 41 can be suppressed. Therefore, even when vibrations occur in the seatbelt retractor 1, the movement of the pawl 42 can be restricted, and this can suppress the occurrence of abnormal noise.

Figure 5:
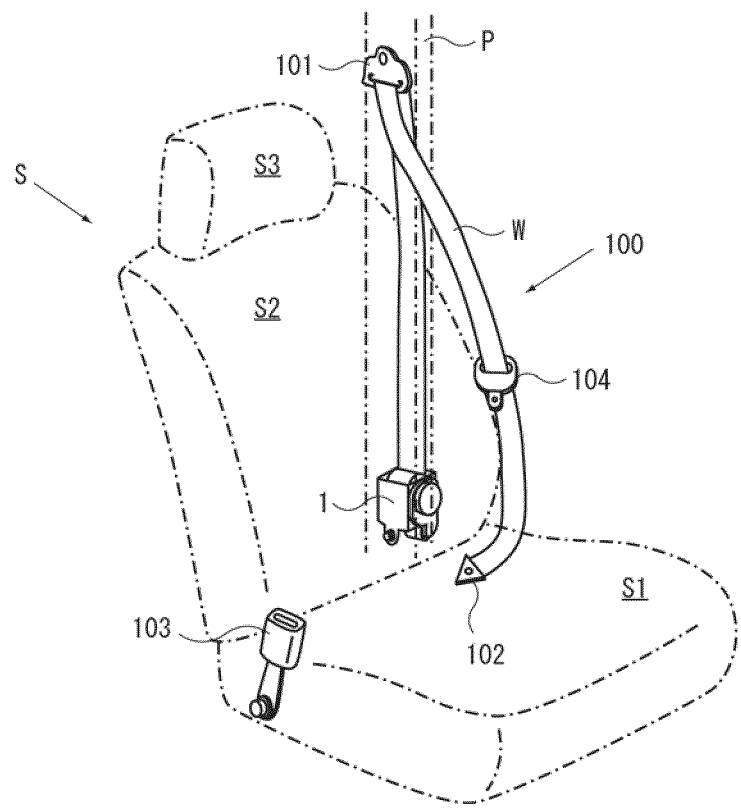
FIG. 5 is an overall configuration view of a seatbelt device according to an embodiment of the present invention.

Next, a seatbelt device according to an embodiment of the present invention will be described with reference to FIG. 5. Here, FIG. 5 is an overall configuration view of the seatbelt device according to the embodiment of the present invention. In FIG. 5, for convenience of explanation, components other than the seatbelt device are shown by one-dot chain lines.

A seatbelt device 100 of the embodiment illustrated in FIG. 5 includes webbing W that restrains an occupant, a seatbelt retractor 1 that retracts the webbing W, a guide anchor 101 provided on the vehicle body to guide the webbing W, a belt anchor 102 that fixes the webbing W to the vehicle body, a buckle 103 disposed on a side surface of a seat S on which the occupant sits, and a tongue 104 disposed on the webbing W. For example, the seatbelt retractor 1 has the structures illustrated in FIGS. 1 to 4B.

Components other than the seatbelt retractor 1 will be briefly described below. For example, the seat S includes a seat section S1 on which the occupant sits, a backrest section S2 located on the back of the occupant, and a headrest section S3 that supports head of the occupant. For example, the seatbelt retractor 1 is built in a B-pillar P of the vehicle body.

In general, the buckle 103 is often disposed on a side surface of the seat section S1, and the belt anchor 102 is often disposed on a lower surface of the seat section S1. The guide anchor 101 is often disposed on the B-pillar P. The webbing W is connected at one end to the belt anchor 102, and is connected at the other end to the seatbelt retractor 1 with the guide anchor 101 being disposed therebetween.

Therefore, when the tongue 104 is fitted in the buckle 103, the webbing W is withdrawn from the seatbelt retractor 1 while sliding in an insertion hole of the guide anchor 101. When the occupant wears the seatbelt or releases the seatbelt to get off the vehicle, the webbing W is retracted by the action of a spring unit 5 of the seatbelt retractor 1 until a fixed load is applied thereto.

While the above-described seatbelt device 100 is obtained by applying the seatbelt retractor 1 of the above embodiment to a normal seatbelt device at the front seat, for example, it may be applied to the rear seat without using the guide anchor 101.

The present invention is not limited to the above-described embodiment, and various modifications can be made without departing from the spirit of the present invention, for example, the present invention may, of course, be applied to a seatbelt device used in conveyances other than the vehicle.

What is claimed is:

1. A seatbelt retractor comprising: a spool that retracts webbing configured to restrain an occupant; a base frame that houses the spool rotatably; and a lock mechanism that restricts rotation of the spool,
    wherein the lock mechanism includes a locking base disposed in an end portion of the spool, a pawl disposed to protrude outward from an outer periphery of the locking base a pawl spring that biases the pawl inward relative to the locking base, and a lock gear disposed coaxially with the locking base to rotate relative to the locking base,
    wherein the pawl includes a first restraint portion that restrains movement of the pawl in one rotating direction of the spool while being located inside the outer periphery of the locking base, and a second restraint portion that restrains the movement of the pawl in an opposite rotating direction of the spool while the movement of the pawl is retrained by the first restraint portion, and
    wherein the pawl is received in a recess provided in the spool or the locking base, and the first restraint portion is a portion in contact with a component having the recess, the second restraint portion is a portion in contact with the lock gear, and the first restraint portion and the second restraint portion form a wedge shape with respect to the component having the recess and the lock gear.

2. A seatbelt device comprising: webbing that restrains an occupant, a seatbelt retractor that retracts the webbing, a guide anchor provided on a vehicle body to guide the webbing, a belt anchor that fixes the webbing to the vehicle body, a buckle disposed on a side surface of a seat on which the occupant sits, and a tongue disposed on the webbing,
    wherein the seatbelt retractor is the seatbelt retractor according to claim 1.

3. The seatbelt retractor according to claim 1, wherein the lock gear includes a cam hole and a guide wall that guide movement of the pawl, the second restraint portion is formed of the cam hole and the guide wall.

4. The seatbelt retractor according to claim 3, wherein the cam hole and the guide wall include a first guide portion provided in the substantially circumferential direction and a second guide portion provided in the substantially radial direction, wherein the second restraint portion is formed by a surface far from the first restraint portion of the second guide portion.

5. The seatbelt retractor according to claim 4, wherein the lock gear includes an engaging portion engageable with the component having the recess in the state in which the movement of the pawl is restrained by the first restraint portion, wherein the engaging portion is configured such that the pawl does not contact with a surface closer to the first restraint portion of a second guide portion.

6. A seatbelt device comprising: webbing that restrains an occupant, a seatbelt retractor that retracts the webbing, a guide anchor provided on a vehicle body to guide the webbing, a belt anchor that fixes the webbing to the vehicle body, a buckle disposed on a side surface of a seat on which the occupant sits, and a tongue disposed on the webbing,
    wherein the seatbelt retractor is the seatbelt retractor according to claim 5.

7. A seat belt device comprising: webbing that restrains an occupant, a seatbelt retractor that retracts the webbing, a guide anchor provided on a vehicle body to guide the webbing, a belt anchor that fixes the webbing to the vehicle body, a buckle disposed on a side surface of a seat on which the occupant sits, and a tongue disposed on the webbing,
    wherein the seatbelt retractor is the seatbelt retractor according to claim 4.

8. A seat belt device comprising: webbing that restrains an occupant, a seatbelt retractor that retracts the webbing, a guide anchor provided on a vehicle body to guide the webbing, a belt anchor that fixes the webbing to the vehicle body, a buckle disposed on a side surface of a seat on which the occupant sits, and a tongue disposed on the webbing, wherein the seatbelt retractor is the seatbelt retractor according to claim 3.

\* \* \* \* \*